United States Patent [19]
Grzyll et al.

[11] Patent Number: 5,264,198
[45] Date of Patent: Nov. 23, 1993

[54] METHOD FOR PRODUCTION OF SPACECRAFT-GRADE $N_2O_4$

[75] Inventors: Lawrence R. Grzyll, Merritt Island; Clyde F. Parrish, Melbourne, both of Fla.; Luis P. Barthel-Rosa, Reno, Nev.

[73] Assignee: Mainstream Engineering Corporation, Rockledge, Fla.

[21] Appl. No.: 995,906

[22] Filed: Dec. 22, 1992

Related U.S. Application Data

[63] Continuation of Ser. No. 677,484, Mar. 29, 1991, abandoned.

[51] Int. Cl.$^5$ ............................................. C01B 21/36
[52] U.S. Cl. ..................................... 423/400; 422/211
[58] Field of Search ........................................ 423/400

[56] References Cited

U.S. PATENT DOCUMENTS

| | | |
|---|---|---|
| 1,193,799 | 8/1916 | Landis . |
| 1,321,376 | 11/1919 | Jones et al. . |
| 1,706,055 | 3/1929 | Davis . |
| 1,722,339 | 7/1929 | Pauling . |
| 1,784,074 | 12/1930 | Pauling . |
| 1,850,129 | 3/1932 | Fischer et al. . |
| 1,850,316 | 3/1932 | Davis . |
| 1,859,863 | 5/1932 | Cederberg . |
| 1,919,005 | 7/1933 | Bray . |
| 1,919,216 | 7/1933 | Handforth . |
| 1,989,267 | 1/1935 | Caro et al. ............................ 423/400 |
| 2,142,646 | 1/1939 | Handforth et al. . |
| 2,167,708 | 8/1939 | Carter et al. . |
| 2,568,396 | 9/1951 | James ................................. 423/400 |
| 2,899,285 | 8/1959 | Carr . |
| 3,063,804 | 11/1962 | Morrow . |
| 3,070,425 | 10/1952 | Grossmann . |
| 3,101,255 | 8/1963 | Carr et al. . |
| 3,674,429 | 7/1972 | Collins ................................. 423/400 |
| 3,904,740 | 9/1975 | Kenson et al. . |
| 3,985,681 | 10/1976 | Sénès et al. . |
| 4,024,219 | 5/1977 | Takahashi et al. ................... 423/400 |
| 4,375,426 | 3/1983 | Knapton et al. . |
| 4,435,201 | 3/1984 | Eastin . |
| 4,512,964 | 4/1985 | Vayenas et al. . |
| 4,657,639 | 4/1987 | Mahadevan et al. ................. 423/400 |
| 4,692,321 | 9/1987 | James et al. . |
| 4,863,893 | 9/1989 | Farrauto et al. .................... 423/403 |

OTHER PUBLICATIONS

J. A. Almquist et al, "Recovery of Nitrogen Oxides from Gas Mixtures by Adsorption on Silica Gel," *Industrial and Engineering Chemistry*, vol. 17, No. 6 (Jun. 1925), pp. 599–603.

*Primary Examiner*—Wayne Langel
*Attorney, Agent, or Firm*—Evenson, McKeown, Edwards & Lenahan

[57] ABSTRACT

A spacecraft-grade $N_2O_4$ product is produced by a method and apparatus which utilize catalytic oxidation of ammonia in a gas phase. The apparatus consists of an ammonia gas supply, an air supply, an air preheater, a catalyst screen converter, one or more condensers, an oxygen supply, a desiccant such as molecular sieves or silica gel, and a cooler/collector. The method includes combusting gaseous ammonia via the catalyst screen in the converter to produce nitric oxide and water. The nitric oxide is subsequently oxidized to form nitrogen dioxide after substantially all of the water produced in the converter has been separated. The nitrogen dioxide is then passed through the molecular sieves and/or silica gel to remove most of any remaining water and iron, and the purified nitrogen dioxide is frozen in the collector to allow the collection of nitrogen tetroxide.

8 Claims, 5 Drawing Sheets

METHOD FOR PRODUCTION OF SPACECRAFT-GRADE N₂O₄

The present invention was made in part with Government support, and the Government has certain rights in the invention.

This is a continuation of application Ser. No. 07/677,484, filed Mar. 29, 1991, abandoned.

BACKGROUND AND SUMMARY OF THE INVENTION

The present invention relates to a method and apparatus for the production of spacecraft-grade nitrogen tetroxide ($N_2O_4$) for use as a bipropellant rocket engine and, more particularly, to a method and portable apparatus which removes water, iron ions and chloride ions with suitable molecular sieves and utilizes catalytic oxidation of ammonia in a gas phase.

Current military spacecraft missions are using nitrogen tetroxide and monomethyl hydrazine ($N_2H_{CH3}$) as the oxidizer and propellant, respectively, for bipropellant rocket engines. Current and planned military space systems project increased use of the bipropellant systems, replacing older hydrazine engines. Such bipropellant systems provide more energy per unit propellant mass than monopropellant systems. Unfortunately, current $N_2O_4$ being supplied to the military and produced by oxidation of nitrosyl chloride causes clogging of filters, valves and nozzles in the propulsion systems due to undesirable levels of dissolved iron, chlorides, water and non-volatile particulates in the oxidizer. Such clogging can thus cause the unnecessary firing of propellant engines to clear the clogs or can render the propulsion system useless, resulting in the loss of spacecraft.

The production of nitrogen tetroxide for industrial purposes has been well known for a long time. For instance, U.S. Pat. No. 3,101,255 describes the production of $N_2O_4$ by the oxidation of ammonia as an alternative to the preparation of nitric acid, since it is easier and more economical to store and ship $N_2O_4$ than nitric acid. The objective was to produce $N_2O_4$ in a normal level of purity without the formation of dilute nitric acid or other by-products. Ammonia was reacted in the presence of stoichiometric amounts of oxygen diluted with nitrogen. In practice, there was a slight excess, 1%, of ammonia. The conventional process removed water before oxidizing the NO to $NO_2$ with stoichiometric portions of oxygen. The $NO_2$ polymerized to gaseous $N_2O_4$ which was condensed to a liquid. The mixture of air, nitrogen, and ammonia was adjusted to give a maximum concentration of oxygen of 12%. Gases were cooled to a temperature of 50° F. and dehumidified before the NO was oxidized. The pressure of the gases in the system was between 45 and 170 psig. For the first oxidation step and after dehydration, the NO was passed through silica gel for additional water removal before final oxidation to $N_2O_4$. Nitrogen was recycled to dilute the incoming air. The reaction temperature reached 1700° F. during the initial oxidation. This heat was transferred to the incoming air with a heat exchanger before it was cooled to 50° F. Nitrogen from the heat exchanger cooling was used as the incoming nitrogen. A waste heat boiler was used to collect heat from the initial oxidation step following by mechanical refrigeration to cool the gas stream to 50° F. The water vapor was first separated mechanically and then by adsorption. Cooling water was used in the second step.

The known process used platinum or platinum alloys as the catalyst for the oxidation. The temperature of the preheated air was 500 to 540° F. at the entrance to the converter. There was a small amount of hydrogen produced in the process for the decomposition of ammonia. Dual adsorption beds were continuously regenerated and used to remove the last traces of water from the $N_2O_4$. The temperature after the NO oxidation process had to be below 73° F. for the $N_2O_4$ to form.

The above-referenced patent does not refer to the purity or level of water present in the final product. Given the state of the art and the industrial applications existing at that time, however, it can only be assumed that the known process produced $N_2O_4$ at a normal level of purity, particularly since there is no discussion of construction materials which we have found necessary for producing high purity $N_2O_4$. The known process does not teach the art how to produce very high purity $N_2O_4$ for today's specific applications such as spacecraft propellants.

U.S. Pat. No. 3,070,425 does describe a process to produce $N_2O_4$ with a minimum purity of 99.5%. Water is used as the coolant without the aid of refrigerant. In this known process, a mixture of NO, $NO_2$, oxygen, and water vapor are diluted in nitrogen, and then the NO is oxidized to $NO_2$ and the water is removed by condensation. The purity of $NO_2$ is increased first by its adsorption in concentrated nitric acid (85 to 95%) and then distilling the $NO_2$ from the concentrated nitric acid. The $NO_2$ fraction is condensed to produce $N_2O_4$ as the temperature is lowered. Conversion of ammonia to NO was accomplished on either a platinum, platinum-rhodium, or cobalt-nickel catalyst at pressures up to 100 psig. The reaction temperatures were in the range of 800 to 960° C. Stainless steel was used as the material of construction for the condenser. Stoneware was used as the packing in the nitric acid adsorption columns and oxygen was added to the $N_2O_4$ water mixture to increase the yield of $HNO_3$ by the reaction:

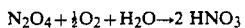

There was also a loss of $NO_2$ by reaction with $H_2O$ to form $HNO_3$ and NO.

Fractionalization of the concentrated nitric acid was done in a multi-plate column constructed of stainless steel, titanium, and tantalum with a glass lined inner tube. The final product had a purity of 99.5% and the product specifications are given below:

| | |
|---|---|
| $N_2O_4$ | 99.5% minimum |
| $H_2O$ | 0.1% maximum (1000 ppm) |
| Cl as NOCL | 0.08% maximum (800 ppm) |
| Non-volatiles | 0.01% maximum (100 ppm) |

These specifications with regard to water, Cl and non-volatiles are many times higher than those needed for spacecraft grade $N_2O_4$. Although this patent describes a method for preparation of 99.5% minimum purity $N_2O_4$, such a method would not produce a sufficiently high purity for today's high technology applications in a simple manner which permits the use of portable and self-contained apparatus.

U.S. Pat. No. 3,063,804 describes a process where high purity $N_2O_4$ was produced by rapidly cooling a mixture of NO to a temperature above its dew point (approximately 90° C.) in a reactor with countercurrent flow to relatively cool nitric acid (concentration 60 to 70%) to produce higher oxides of nitrogen. Then water and nitric acid were removed as condensate and the overhead was primarily $NO_2$, $N_2$, and $O_2$. Residual water and nitric acid were removed by fractional distillation of crude $N_2O_4$ to give a final product purity of 99+% nitrogen tetroxide. The process used the liquid phase reaction:

$$NO + 2\ HNO_3 \rightarrow 3\ NO_2 + H_2O$$

for the conversion of NO to $NO_2$, which is favored at high acid concentrations and high temperatures. Again, however, such a process did not produce a product of sufficient purity with a portable and self-contained apparatus using a simple method which avoids waste by-products and allows the product to move freely through the production apparatus.

It is, therefore, an object of the present invention to produce a spacecraft-grade $N_2O_4$ with a portable and self-contained apparatus and method which filters the product and avoids waste by-products.

We have found that the impurity problem of commercially available $N_2O_4$ can be overcome by producing the oxidizer via catalytic combustion of ammonia in a gas phase. Catalytic combustion of ammonia yields inherently pure $N_2O_4$.

According to a presently contemplated apparatus and method for carrying out the present invention, commercial grades of ammonia and air (a flow ratio of about 10% ammonia) are passed to an ammonia converter that contains a conventional platinum screen catalyst. The ammonia combustion is initiated by preheating the catalyst screen using a hydrogen flame, which is shut off after ignition or heating the catalyst screen with hot air to ignite the ammonia. The combustion of ammonia produces nitric oxide and water, which are passed through two condenser/coolers that collect the majority of the water by-product. The product gases are then mixed with pure oxygen to oxidize the nitric oxide product to nitrogen dioxide. The gaseous nitrogen dioxide is then passed through a desiccant such as silica gel or molecular sieves to perform gas-phase removal of the remaining low-level water and any iron entrained in the product. The nitrogen tetroxide is collected by freezing the product in a collection cylinder.

The various reactions of the process are:

$$4\ NH_3 + 5\ O_2 \rightarrow 4\ NO + 6\ H_2O$$

$$4\ NO + 2\ O_2 \rightarrow 4\ NO_2$$

$$4\ NO_2 \rightarrow 2\ N_2O_4$$

Other competing side-reactions could take place, but the above-specified reactions are the primary process reactions.

The results of analysis of the final product have demonstrated that the present invention is advantageous in that it has produced $N_2O_4$ which has exceeded the five key product specifications of (1) dissolved chloride, (2) dissolved iron, (3) nitric oxide content, (4) water content and (5) nitrogen tetroxide purity. In addition, the present invention has the advantages of providing the ability to control the NO content of the product by adjusting various process parameters of the process.

One presently contemplated embodiment of the apparatus of the present invention comprises an air preheater, an ammonia/air converter, a plurality of cooler/condensers, a desiccant such as a plurality of molecular sieve or silica gel columns, or a combination thereof, and a product collection cold finger. The apparatus is constructed completely of 304 or 316 stainless steel (e.g. 304 or 316 grade) and glass. All stainless steel components are fastened to an angle iron framework assembled in a fume hood. Alternatively, all glass components are clamped to ring stands in a fume hood. Glassware connections are made with ground-glass joints or with short sections of Teflon ® tubing.

Raw materials for the process can consist of medical breathing air which is a mixture of liquid nitrogen and liquid oxygen, anhydrous ammonia, and industrial grades of hydrogen and oxygen. Appropriate and conventional gas regulators and check valves are used with all gases. Flow rates of air, ammonia and oxygen are monitored using standard flowmeters. The air and ammonia are connected to the converter via stainless steel tubing, e.g. ¼" OD tubing. The oxygen is delivered downstream to the apparatus via Teflon ® tubing, whereas the hydrogen is delivered to the converter with stainless steel tubing.

BRIEF DESCRIPTION OF THE DRAWINGS

These and other objects, features and advantages will become more readily apparent from the following detailed description of a currently preferred embodiment when taken in conjunction with the accompanying drawings wherein.

DETAILED DESCRIPTION OF THE DRAWINGS

Figure 1:
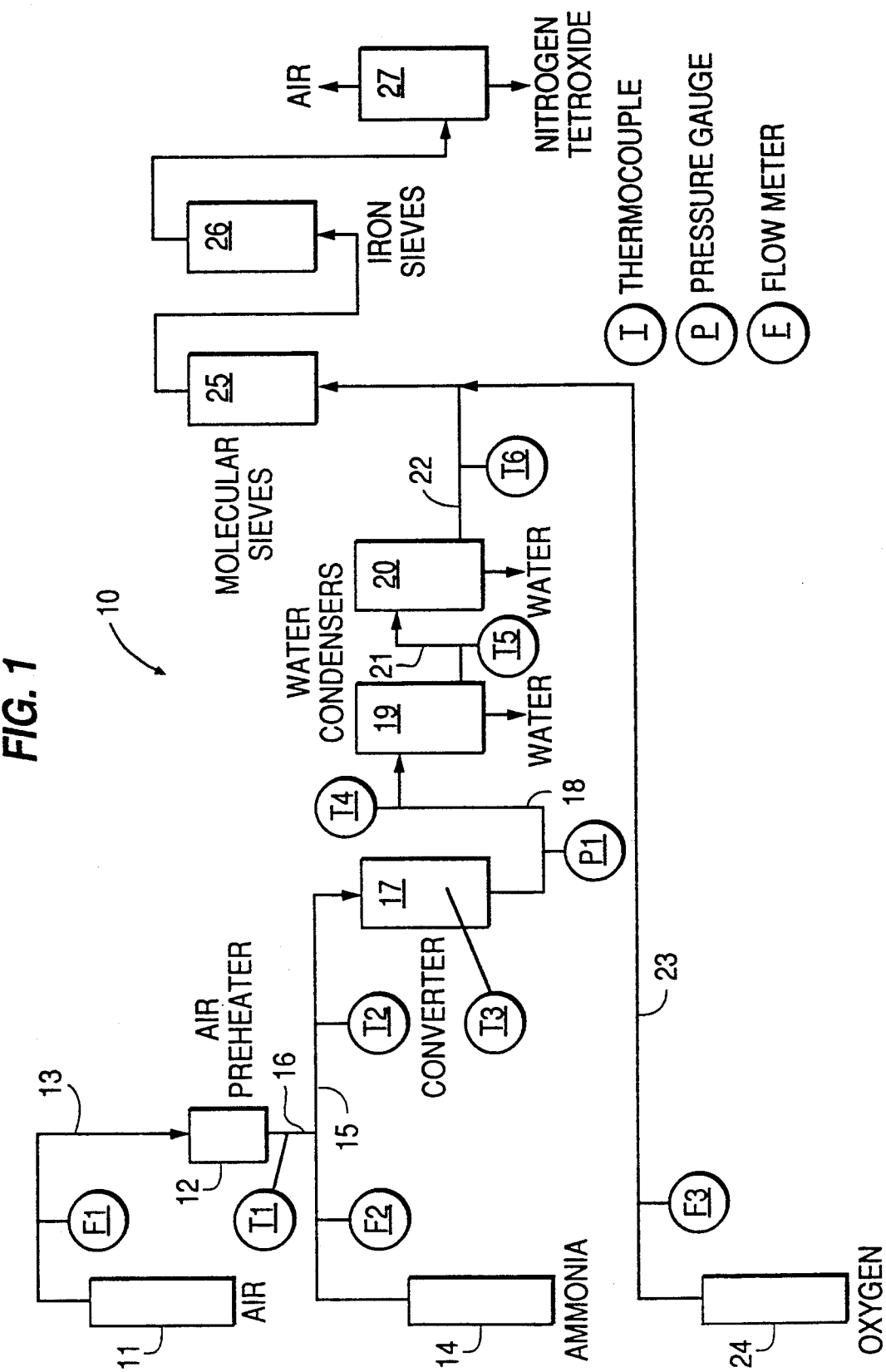
FIG. 1 is a schematic of the apparatus for producing spacecraft-grade $N_2O_4$ in accordance with the present invention.

As shown in FIG. 1, the apparatus of the present invention designated generally by numeral 10 comprises an air supply 11 for supplying air to an air preheater 12 (FIG. 2) through a line 13. A conventional flow meter F1 is arranged in the line 13 between the air supply 11 and the air preheater 12. There is also an ammonia ($NH_3$) supply 14 which is mixed in a desired ratio with preheated air from the preheater 12 through line 15 which communicates with an exit line 16 from the preheater which is provided with a conventional thermocouple T1. Another conventional flow meter F2 is arranged in the line 15 between the ammonia supply 14 and the preheater exit line 16. A second thermocouple T2 is provided in the line 15 between the preheater exit line 16 and the inlet of a catalyst screen converter 17 (FIG. 3) which also has a thermocouple T3.

The product which exits from the converter 17 after ammonia combustion through a line 18 is passed through condensers 19, 20 (FIG. 4) to condense the water contained therein. A pressure gauge P1 and a thermocouple T4 are arranged in the line 18 between the outlet of the converter 17 and the inlet to the water condenser 19. Furthermore, a thermocouple T5 is arranged in the line 21 connecting the outlet of condenser 19 to the inlet of condenser 20. The product exits from the second condenser 20 through a line 22 which has a thermocouple T6 operatively associated therewith. The line 22 forms a junction with a line 23 leading from an industrial-grade oxygen supply 24 to form nitrogen dioxide. The product nitrogen dioxide then proceeds to a column 25 of molecular sieves to perform gas-phase removal of remaining water and to a second column 26 of molecular sieves to remove iron entrained in the product. The molecular sieve columns 25, 26 are shown in more detail in FIG. 5. Finally, the purified product is passed to a collection cylinder 27 in which liquid $N_2O_4$ is collected and gaseous nitrogen is removed in an air mixture.

Figure 2:
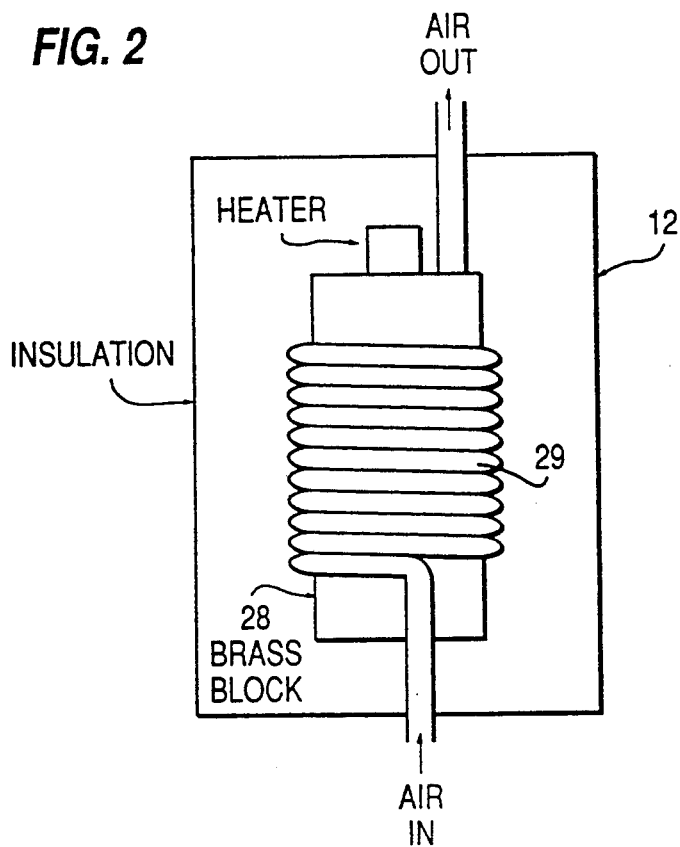
FIG. 2 is a more detailed schematic of an air preheater used in the apparatus of FIG. 1.

The air preheater 12 shown in FIG. 2 is configured to heat the air entering the converter 17 to about 240° C. The preheater 12 can be a commercially available cartridge heater. The heater is inserted into a brass sleeve or block 28. Air tubing 29 is coiled around the entire sleeve length of the block 28 to ensure adequate heat transfer area and is spot-welded to the sleeve 28. The preheater 12 is controlled with a known autotransformer (not shown). The air leaving the preheater 12 is mixed with ammonia prior to entering the converter 17 as shown in FIG. 1.

Figure 3:
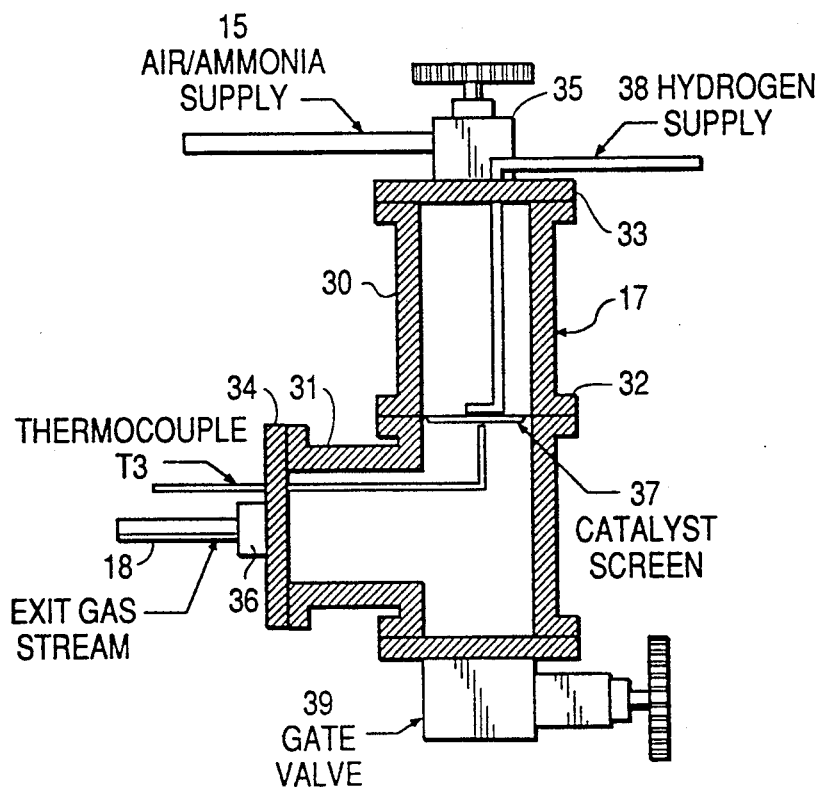
FIG. 3 is a more detailed schematic of a converter used in the apparatus of FIG. 1.

The converter 17 shown in FIG. 3 can be constructed out of commercially available high-vacuum components such as a stainless steel nipple 30 and stainless steel tee 31, which are connected by a flange 32. Converter openings can be equipped with blank flanges 33, 34 with threaded holes (not shown) for entering and exiting tubing. Tube fittings 35, 36, respectively, for entering and exiting gases are welded to the blank flanges 35, 36. A three platinum catalyst screen 37 is pressed in place between two nickel gaskets and placed on the flange 32 connecting the nipple 30 to the tee 31. Hydrogen supply tubing 38 extends down to the catalyst screen 37 and has a 90° bend so that it is parallel to the screen 37. The hydrogen tube 38 is crimped on the end and has a hole for the hydrogen flame in a known manner. The thermocouple T3 is placed immediately downstream from the catalyst screen 37. The converter 17 has two exits, one equipped with a stainless steel gate valve 39 that opens to a fume hood (not shown) and the other exit equipped with a welded tube fitting 36 connected to ½-inch 18 tubing that leads to the first cooler/condenser 19. For safety reasons, the gate valve 39 is opened during reaction ignition. Opening this valve also allows operators to see if the catalyst screen 37 is glowing red which is evidence of reaction ignition. The gate valve 39 is closed when reaction ignition is complete, and the exit gases pass totally through the first cooler/condenser 19.

Figure 4:
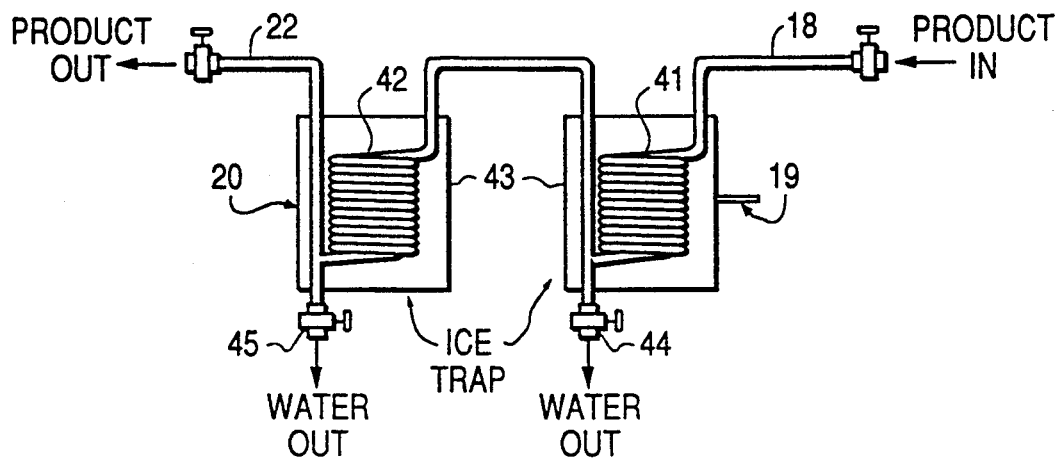
FIG. 4 is a more detailed schematic of a cooler/condenser used in the apparatus of FIG. 1.

The cooler/condensers 19, 20 which in FIG. 4 are configured and sized to cool the hot gases leaving the converter 17 and to condense the water byproduct. These units can be constructed by coiled tubing 41, 42 submerged in an ice/water bath. A PVC container 43 holds each ice/water bath. The gases proceed downward through the coil 41 where they reach a tee 44 connected to a stainless steel water trap. The gases then proceed to coil 42 and again reach a tie 45 connected to a water trap and the process exit 22. Condensed water flows downward into the trap while non-condensable process gases proceed to the cooler/condenser exit. After exiting the second cooler/condenser 20, the process gases are mixed with pure oxygen from the supply 24 to oxidize the nitric oxide to nitrogen dioxide.

Figure 5:
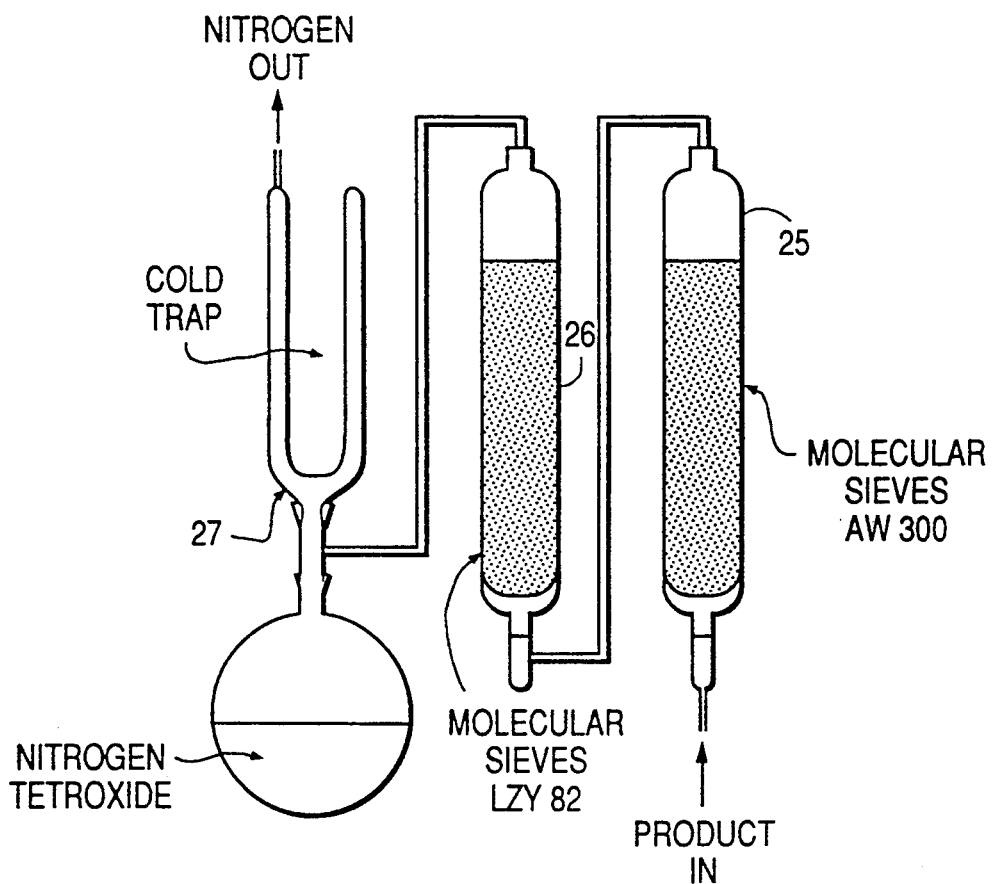
FIG. 5 is a more detailed schematic of molecular sieve columns used in the apparatus of FIG. 1.

The molecular sieve columns 25, 26 and product collection cold finger 27 shown in FIG. 5 are configured to remove any iron and water impurities in the process gases and to collect the purified $N_2O_4$ by freezing the product on the cold finger surface. These units are constructed entirely of glass, with a small piece of Teflon ® tubing connecting the stainless steel tubing to the glass tubing. The two sieve columns 25, 26 are arranged in series, the first column 25 holding commercial water-removal sieves, e.g. AW 300, and the second column holding commercial iron-removal sieves, e.g. LZY 82. Glass wool can be used to support the sieves in the columns. Teflon ® sleeves are used on all ground-glass joints. Liquid nitrogen or crushed dry ice is used to provide the cooling in the cold trap for product collection. The non-condensable gases leaving the cold finger in the collector 27 are passed to a conventional scrubber/bubbler containing NaOH solution for neutralization (not shown).

System pressure is measured using the known pressure gauge P1. The gauge P1 is located in the tubing 18 connecting the converter 17 to the first cooler/condenser 19. Process stream temperatures are monitored using type-K thermocouples T1 through T6 and a 10-channel thermocouple reader (not shown) connected with the thermocouples.

For start-up of the process, the air preheater 12 is turned on, and air is allowed to flow through the preheater 12 to the converter 17 at the desired rate, where it passes through the open gate valve 39. Once the air temperature entering the converter 17 reaches about 200° C., the hydrogen gas is turned on and supplied through line 38. Only a very small amount of hydrogen gas is required for ignition. Ignition of the hydrogen is spontaneous in the hot air stream, and thus no igniter is required. Ignition of the hydrogen is detected by viewing a glow in a small section of the catalyst screen 37 through the gate valve 39 using a small mirror. Once the hydrogen flame is ignited, the ammonia flow is set to the desired rate and the hydrogen is shut off. The ammonia oxidation reaction begins as detected by observing the red-glowing screen 37; thereafter, the gate valve 39 is closed to divert flow to the first cooler/condenser 19.

This start-up process typically takes less than one minute. The catalyst screen 37 should undergo an initial activation process to make start-up easier. This can be accomplished by running the reaction in the presence of hydrogen for a period of time, e.g., about an hour, by placing a small igniter at the exit of the hydrogen supply 38 to ignite the hydrogen flame in the air stream, after which the ammonia flow is turned off.

Laboratory production runs without using the molecular sieves 25, 26 but using the remaining process of the present invention were made to investigate various process parameters for determining their affect on product quality. The results are set forth in Tables 1 and 2 below.

TABLE 1

SUMMARY OF LABORATORY $N_2O_4$ PRODUCTION RUNS

| RUN | AIR FLOW | AMMONIA FLOW | DOWNSTREAM FLOW | RUN TIME | WATER | $N_2O_4$ | NO CONTENT |
|---|---|---|---|---|---|---|---|
| 1 | 50 SCFH | 7.8 SCFH | 0.0 | 60 min | 214 ml | 82.2 g | N.D. |
| 2 | 50 SCFH | 5.2 SCFH | 0.0 | 40 min | 79 ml | 38.9 g | N.D. |
| 3 | 50 SCFH | 6.5 SCFH | 0.0 | 60 min | 148 ml | 76.7 g | N.D. |
| 4 | 50 SCFH | 9.1 SCFH | 0.0 | 60 min | 248 ml | 43.4 g | 17.1 wt % |
| 5 | 50 SCFH | 7.8 SCFH | 0.0 | 60 min | 230 ml | 70.5 g | 6.2 wt % |
| 6 | 25 SCFH | 3.9 SCFH | 0.0 | 60 min | 94 ml | 63.2 g | 3.2 wt % |
| 7 | 25 SCFH | 3.9 SCFH | 0.0 | 60 min | 87 ml | 53.5 g | 4.8 wt % |
| 8 | 50 SCFH | 5.2 SCFH | 20 SCFH AIR | 40 min | 51 ml | 8.0 g | N.D. |
| 10 | 25 SCFH | 3.9 SCFH | 10 SCFH AIR | 60 min | 100 ml | 41.2 g | 1.1 wt % |
| 11 | 25 SCFH | 5.2 SCFH | 10 SCFH AIR | 60 min | 145 ml | 59.9 g | 4.7 wt % |
| 12 | 25 SCFH | 2.6 SCFH | 10 SCFH AIR | 60 min | 47 ml | 35.2 g | 0.6 wt % |
| 14 | 15 SCFH | 2.0 SCFH | 0.0 | 67 min | 105 ml | 22.3 g | 15.4 wt % |
| 15 | 15 SCFH | 2.0 SCFH | 5 SCFH AIR | 60 min | 70 ml | 33.8 g | N.D. |
| 17 | 15 SCFH | 2.0 SCFH | 2.5 SCFH AIR | 60 min | 84 ml | 13.7 g | 9.4 wt % |
| 19 | 30 SCFH | 3.9 SCFH | 5 SCFH AIR | 40 min | 75 ml | 26.3 g | 8.1 wt % |
| 20 | 30 SCFH | 3.9 SCFH | 3.8 SCFH $O_2$ | 60 min | 130 ml | 107.9 g | 1.1 wt % |
| 21 | 30 SCFH | 3.9 SCFH | 5.7 SCFH $O_2$ | 60 min | 133 ml | 115.8 g | 0.57 wt % |
| 22 | 30 SCFH | 3.9 SCFH | 7.6 SCFH $O_2$ | 60 min | 149 ml | 119.5 g | 0.36 wt % |
| 23 | 30 SCFH | 3.9 SCFH | 1.9 SCFH $O_2$ | 40 min | 91 ml | 61.5 g | N.D. |
| 24 | 30 SCFH | 3.9 SCFH | 4.8 SCFH $O_2$ | 5 hrs | 707 ml | 567.9 g | 1.25 wt % |
| 26 | 30 SCFH | 3.9 SCFH | 4.8 SCFH $O_2$ | 60 min | 120 ml | 121.0 g | 2.16 wt % |
| 27 | 30 SCFH | 3.9 SCFH | 9.5 SCFH $O_2$ | 60 min | 148 ml | 113.7 g | 0.80 wt % |

SCFH = STANDARD CUBIC FEET PER HOUR
N.D. = NO DATA

TABLE 2

PRODUCT YIELDS OF PRODUCTION RUNS BASED ON AMMONIA (1-HOUR BASIS)

| RUN # | MOLS $NH_3$ | MOLS $O_2$ | DWNSTRM MOLS $O_2$ | THEO MOLS $H_2O$ | ACT MOLS $H_2O$ | % $H_2O$ YIELD | THEO MOLS $N_2O_4$ | ACT MOLS $N_2O_4$ | % $N_2O_4$ YIELD | NO WT % |
|---|---|---|---|---|---|---|---|---|---|---|
| 1 | 9.24 | 12.25 | 0.0 | 13.86 | 11.88 | 86.4 | 4.62 | 0.89 | 19.3 | ND |
| 2 | 6.16 | 12.25 | 0.0 | 9.24 | 6.58 | 71.2 | 3.08 | 0.63 | 20.5 | ND |
| 3 | 7.70 | 12.25 | 0.0 | 11.55 | 8.22 | 71.2 | 3.85 | 0.83 | 21.6 | ND |
| 4 | 10.78 | 12.25 | 0.0 | 16.17 | 13.78 | 85.2 | 5.39 | 0.47 | 8.7 | 17.1 |
| 5 | 9.24 | 12.25 | 0.0 | 13.86 | 12.78 | 92.2 | 4.62 | 0.77 | 16.7 | 6.2 |
| 6 | 4.62 | 6.12 | 0.0 | 6.93 | 5.22 | 75.3 | 2.31 | 0.69 | 29.9 | 3.2 |
| 7 | 4.62 | 6.12 | 0.0 | 6.93 | 4.83 | 69.7 | 2.31 | 0.58 | 25.1 | 4.8 |
| 8 | 6.16 | 12.25 | 4.9* | 9.24 | 4.25 | 45.9 | 3.08 | 0.14 | 4.6 | ND |
| 10 | 4.62 | 6.12 | 2.5* | 6.93 | 5.56 | 80.2 | 2.31 | 0.45 | 19.5 | 1.1 |
| 11 | 6.16 | 6.12 | 2.5* | 9.24 | 8.06 | 87.2 | 3.08 | 0.65 | 21.1 | 4.7 |
| 12 | 3.08 | 6.12 | 2.5* | 4.62 | 2.61 | 56.5 | 1.54 | 0.38 | 24.7 | 0.6 |
| 14 | 2.37 | 3.68 | 0.0 | 3.56 | 5.83 | 163.8 | 1.19 | 0.24 | 20.2 | 15.4 |
| 15 | 2.37 | 3.68 | 1.2* | 3.56 | 3.89 | 109.3 | 1.19 | 0.37 | 31.1 | ND |
| 17 | 2.37 | 3.68 | 0.6* | 3.56 | 4.67 | 131.2 | 1.19 | 0.15 | 12.6 | 9.4 |
| 19 | 4.62 | 7.35 | 1.2* | 6.93 | 6.25 | 90.2 | 2.31 | 0.43 | 18.6 | 8.1 |
| 20 | 4.62 | 7.35 | 4.4# | 6.93 | 7.22 | 104.2 | 2.31 | 1.17 | 50.7 | 1.1 |
| 21 | 4.62 | 7.35 | 6.7# | 6.93 | 7.39 | 106.6 | 2.31 | 1.26 | 54.6 | 0.57 |
| 22 | 4.62 | 7.35 | 8.9# | 6.93 | 8.28 | 119.5 | 2.31 | 1.30 | 56.3 | 0.36 |
| 23 | 4.62 | 7.35 | 2.2# | 6.93 | 7.56 | 109.1 | 2.31 | 1.00 | 43.3 | ND |
| 24 | 4.62 | 7.35 | 5.6# | 6.93 | 7.85 | 113.3 | 2.31 | 1.23 | 53.3 | 1.25 |
| 26 | 4.62 | 7.35 | 5.6# | 6.93 | 6.67 | 96.3 | 2.31 | 1.32 | 57.1 | 2.16 |
| 27 | 4.62 | 7.35 | 11.1# | 6.93 | 8.22 | 118.6 | 2.31 | 1.24 | 53.7 | 0.80 |

*Downstream Air Used As Oxidizing Gas
downstream Oxygen Used As Oxidizing Gas
ND No Data Table 2 presents the data from Table 1 in a different form. All gas flows are listed in terms of moles, and the water and $N_2O_4$ yields are presented based on the moles of ammonia supplied to the converter. Volumetric flowrates from Table 1 were converted to molecular flowrates in Table 2 using molar volumes obtained from superheated ammonia and oxygen tables. The $N_2O_4$ yields in Table 2 reflect a product collection efficiency of the process. Some of the $NO_2$ formed in the process was not collected on the cold finger and passed out the exit. Some of the water yields in Table 2 are over 100%. This is due to the formation of some $NO_2$ between the converter 17 and the cooler/condenser 19. In the presence of excess oxygen, very little NO will oxidize to $NO_2$, but below 160° C., some of the NO may oxidize to $NO_2$. Since $NO_2$ is soluble in water and NO is not, any $NO_2$ that is formed will be removed with the condensed water. This accounts for some of the water yields being above 100%.

Figure 6:
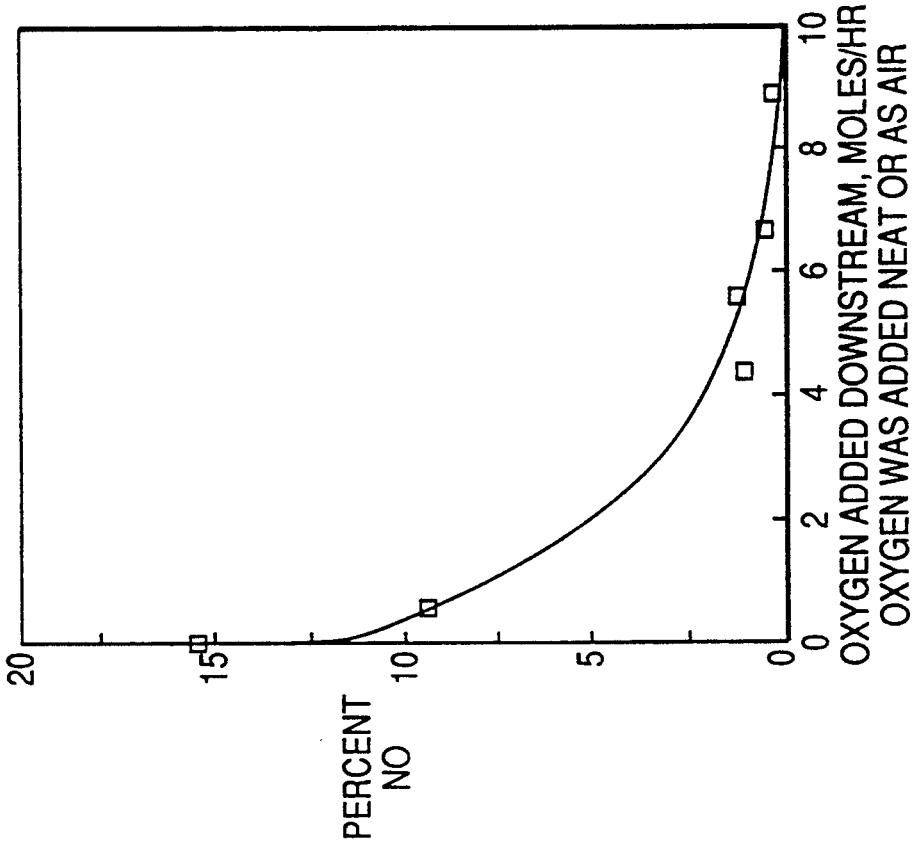
FIG. 6 is a graph showing the NO content of the nitrogen tetroxide product in relation to the oxygen added downstream.

FIG. 6 is a plot of the NO content of the product versus the moles of oxygen added to the process downstream and shows that increasing the amount of oxygen added downstream decreases the NO content of the product. The increased amount of oxygen added downstream increases the concentration of oxygen in the oxidizing section, increasing the reaction rate of NO oxidation.

Figure 7:
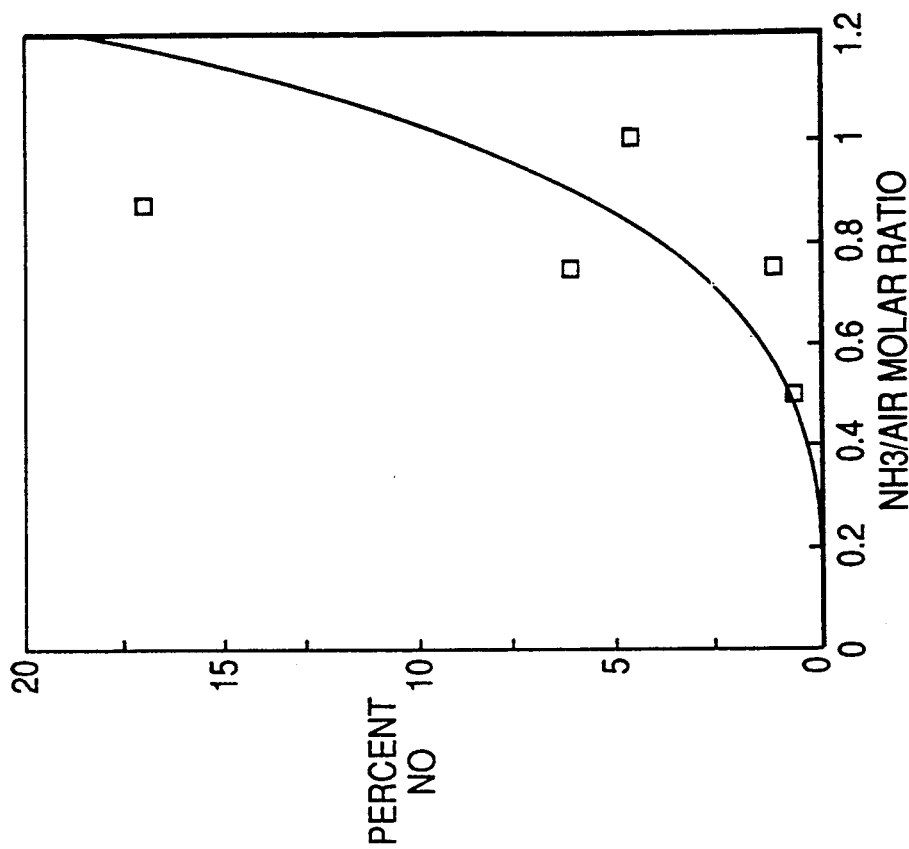
FIG. 7 is a graph showing the NO content of the product in relation to the ammonia ($NH_3$)/air ratio to the converter.
Figure 8:
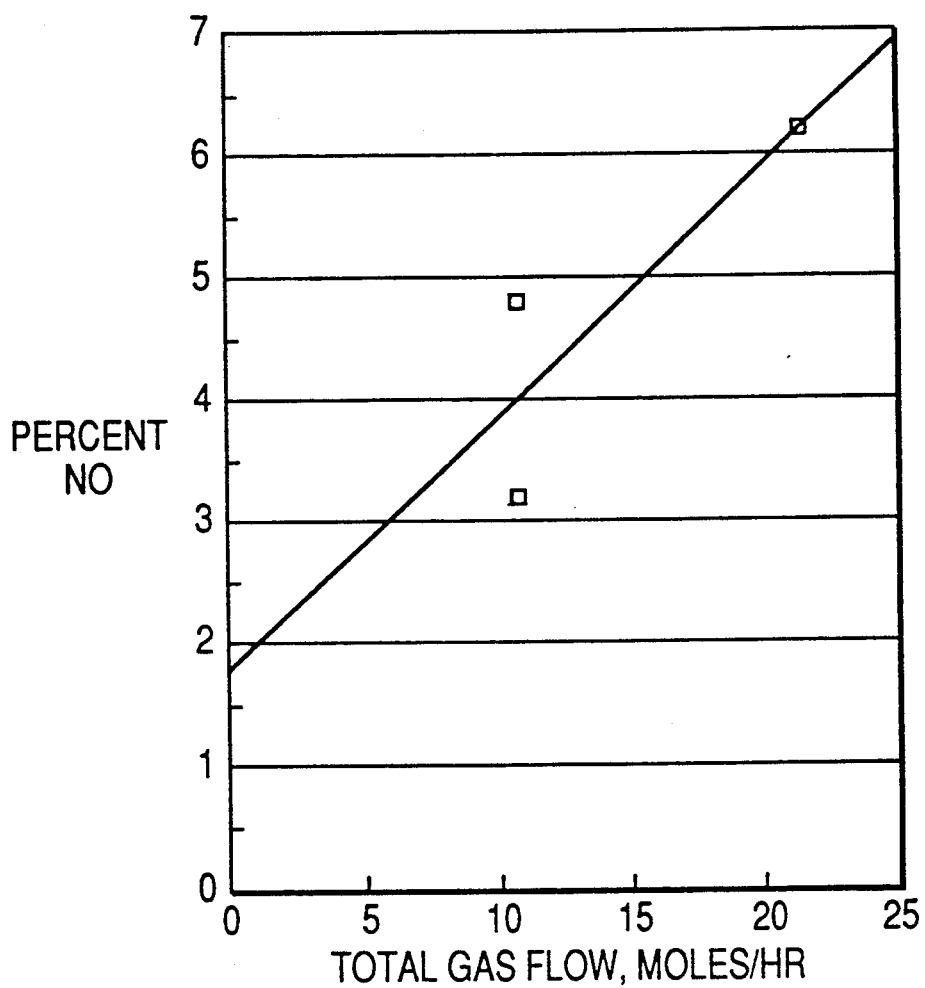
FIG. 8 is a graph showing the NO content of the product in relation to total gas flow.

Additional control of the NO content can be achieved by adjusting the ammonia/air ratio to the converter or the total flow rate in the process. In particular, FIG. 7 shows that increasing the ammonia/air ratio increases the NO content of the product. Increasing the ammonia/air ratio decreases the amount of oxygen available for oxidation of nitric oxide. FIG. 8 shows that increasing the total process flow rate decreases the time for oxidation time resulting in an increased NO content in the product.

The data in Table 2 show that the $N_2O_4$ yields double when downstream oxygen is added to the process. The yields achieved when no downstream gas are added or when downstream air is added are around 20-25%, while the yields with downstream oxygen added are around 50-55%. This is primarily due to an increased concentration of oxygen available downstream for nitric oxide oxidation and a decrease in the total flow rate (compared to downstream air), which increases the collection efficiency.

Production runs using the process and apparatus of the present invention, including molecular sieves, provided the data in Table 3 below as to water content, iron content, chloride content, NO content and $N_2O_4$ assays:

TABLE 3
SPECIFICATIONS FOR "SPACECRAFT-GRADE" AND "PURIFIED LOW-IRON MON-1" NITROGEN TETROXIDE

| SPECIFICATION | SPACECRAFT-GRADE | PURIFIED LOW-IRON MON-1 |
|---|---|---|
| Nitric Oxide | 0.6-1.0 wt % | 0.6-1.0 wt % |
| $N_2O_4$ + NO | 99.99 wt % min. | 99.99 wt % min. |
| Water Equiv. | 0.01 wt % max. | 0.05 wt % max. |
| Chloride | 5 ppm max. | 100 ppm max. |
| Iron | 0.1 ppm max. | 0.03 ppm max. |
| Aluminum | 0.1 ppm max. | 0.1 ppm max. |
| Silicon | 0.1 ppm max. | 0.1 ppm max. |
| Sodium | 0.1 ppm max. | 0.1 ppm max. |
| Potassium | 0.1 ppm max. | 0.1 ppm max. |
| Non Volatile Residue | 10 ppm max. | 10 ppm max. |
| Particulate | 1.0 mg/l (10u) | 1.0 mg/l (10u) |
|  | 2.0 mg/l (5u) | 2.0 mg/l (5u) |

As Table 4 below, which summarizes product qualification runs, shows, the product produced with the present invention exceeds the "spacecraft-grade" and purified low-iron MON-1 grade specification tested:

TABLE 4
SUMMARY OF PRODUCT QUALIFICATION RUNS

| SPEC. | SPACECRAFT-GRADE | PURIFIED LOW-IRON MON-1 | PRESENT INVENTION |
|---|---|---|---|
| Nitric Oxide | 0.6-1.0 wt % | 0.6-1.0 wt % | 0.0-3.0 wt % |
| $N_2O_4$ + NO | 99.99 wt % min. | 99.99 wt % min. | 100.1 wt % |
| Water Equiv. | 0.01 wt % max. | 0.05 wt % max. | 0.008 wt % |
| Chloride | 5 ppm max. | 100 ppm max. | 3 ppm |
| Iron | 0.1 ppm max. | 0.03 ppm max. | 0.006 ppm |

Standard mass and energy balances for the process of the present invention can be used to build a production-size apparatus. By way of example, a mass balance can be performed around the converter 17, the cooler/condenser 19, 20 (assumed to be one unit), the oxidizing section and the product collection section 27. Certain assumptions can be made such as:

1. The oxidation of ammonia in the converter is 100% based on ammonia.
2. In the presence of excess oxygen, very little conversion of NO to $NO_2$ is made at temperatures above 160° C. However, conversion of NO to $NO_2$ can be achieved before the first cooler/condenser 19 where the temperature does drop below 160° C. Since the $NO_2$ is soluble in water and the NO is not, the $NO_2$ that is formed to this point is removed with the condensed water. This accounts for the water yields being above 100% of theoretical.
3. All of the water formed is collected in the cooler/condenser.
4. All of the NO that passes through the cooler/condenser is oxidized to $NO_2$ in the oxidizer section.
5. Gas densities were taken from reference tables.
6. All material balances are based on per-hour flows.

The material balances for the various process units and the overall balance from a steady-state base production run are set forth below in Table 5:

TABLE 5
MASS BALANCES FOR PROCESS

| Component | In | | Out | |
|---|---|---|---|---|
| *Converter Balance* | | | | |
| Ammonia | 78 g | 4.6 mols | — | — |
| Oxygen | 235 g | 7.3 mols | 50 g | 1.6 mols |
| Nitrogen | 772 g | 27.6 mols | 772 g | 27.6 mols |
| Nitric Oxide | — | — | 138 g | 4.6 mols |
| Water | — | — | 125 g | 6.9 mols |
|  | 1085 g | | 1085 g | |
| *Cooler/Condenser Balance* | | | | |
| Oxygen | 50 g | 1.6 mols | 44 g | 1.4 mols |
| Nitrogen | 772 g | 27.6 mols | 772 g | 27.6 mols |
| Nitric Oxide | 138 g | 4.6 mols | 128 g | 4.3 mols |
| Water | 125 g | 6.9 mols | 125 g | 6.9 mols |
| Nitrogen Dioxide | — | — | 16 g | 0.4 mols |
|  | 1085 g | | 1085 g | |
| *Oxidizer Section Balance* | | | | |
| Oxygen* | 230 g | 7.2 mols | 162 g | 5.1 mols |
| Nitrogen | 772 g | 27.6 mols | 772 g | 27.6 mols |
| Nitric Oxide | 128 g | 4.3 mols | — | — |
| Nitrogen Dioxide | — | — | 196 g | 4.3 mols |
|  | 1130 g | | 1130 g | |
| *186 g of downstream oxygen added at this location | | | | |
| *Product Collection Section Balance* | | | | |
| Ammonia | 78 g | 4.6 mols | — | — |
| Oxygen** | 421 g | 13.1 mols | 162 g | 5.1 mols |
| Nitrogen | 772 g | 27.6 mols | 772 g | 27.6 mols |
| Water | — | — | 125 g | 6.9 mols |
| Nitrogen Dioxide* | — | — | 98 g | 2.1 mols |
| Nitrogen Tetroxide | — | — | 114 g | 1.2 mols |
|  | 1271 g | | 1271 g | |

*Includes Nitrogen Dioxide removed with water as well
**Includes Oxygen supplied to the converter and downstream Likewise, an energy balance can be performed around the air preheater 12, the converter 17, the cooler/condenser 19, 21, the oxidizing section, and the product collection section 27. This energy balance will aid in sizing the heat exchangers for a scaled-up process. The flows from the base run mass balance can be the basis for energy balance calculation. The thermodynamic properties for ammonia, nitrogen, oxygen, nitric oxide, nitrogen dioxide, water, and nitrogen tetroxide are taken from various reference tables. The following assumptions are made in the energy balance calculations:

1. The preheater 12 is assumed to heat the process air from 25° C. to 250° C., which is the temperature of T2 (FIG. 1).
2. The converter 17 raises the temperature of the gases from 250° C. to 518° C., the temperature at T3, due to the heat of ammonia combustion.
3. The cooler/condenser 19, 20, assumed to be one unit, cools the gases to 10° C., the temperature of T5, and condenses the water and the $NO_2$ that has formed up to this point in the process. The input temperature to the cooler/condenser 19, 20 is assumed to be the temperature at the converter (T3), and the output temperature is assumed to be the temperature at the exit of the second cooler/condenser (T5).

4. The oxidizer section rejects the heat of the NO oxidation.

5. The product collection section 27 cools the noncondensable process gases to −11° C. and condenses and freezes the $N_2O_4$ product.

Table 6 gives the results of a typical energy balance calculations based around the various process components:

TABLE 6

| HEAT DUTIES OF PROCESS UNITS | |
| --- | --- |
| UNIT | HEAT DUTY |
| Air Preheater | 66 W |
| Converter | −179 W |
| Cooler/Condenser | −263 W |
| Oxidizer Section | −68 W |
| Product Collection Section | −119 W |

The present invention provides the advantage of keeping the $N_2O_4$ in the gaseous phase until purification is complete. The product is condensed only after drying and purification are complete. Additionally, the process described can remove water one step earlier, i.e. before oxidation of the NO; this allows the product to be less acidic and to move through the system more freely because the $N_2O_4$ is kept in the gas state.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method for producing spacecraft-grade $N_2O_4$, comprising the steps of:

supplying an ammonia/preheated air mixture to a converter of a system;

producing nitric oxide and water by ammonia combustion in the converter;

passing the nitric oxide and water to condenser means to separate and collect a substantial portion of water by-product;

supplying the nitric oxide with oxygen to produce nitrogen dioxide;

passing the nitrogen dioxide through desiccant means for removing residual water and iron; and freezing the nitrogen dioxide so as to produce and collect liquid phase nitrogen tetroxide.

2. The method according to claim 1, wherein the step of producing nitric oxide includes supplying hydrogen during a desired time interval for preheating a catalyst screen in the converter.

3. The method according to claim 1, wherein the step of passing the nitric oxide and water to the condenser means includes passing the nitric oxide and water through more than one condenser and separating water at each condenser.

4. The method according to claim 2, wherein the step of passing the nitric oxide and water to the condenser means includes passing the nitric oxide and water through more than one condenser and separating water at each condenser.

5. The method according to claim 1, wherein the step of passing the nitrogen dioxide through the desiccant means includes passing the nitrogen dioxide through a first column having at least one of molecular sieves and silica gel for removing substantially any remaining water and then passing the nitrogen dioxide through a second column having at least one of molecular sieves and silica gel for removing substantially any remaining iron.

6. The method according to claim 5, wherein the step of producing nitric oxide includes supplying hydrogen during a desired time interval for preheating a catalyst screen in the converter.

7. The method according to claim 6, wherein the step of passing the nitric oxide and water to the condenser means includes passing the nitric oxide and water through more than one condenser and separating water at each condenser.

8. The method according to claim 1, wherein the step of producing nitric oxide includes controlling NO content by one of adjusting the ammonia/preheated air ratio, adjusting flowrate of materials passing through the system, and adjusting the amount of oxygen supplied to the nitric oxide.

* * * * *